UNITED STATES PATENT OFFICE.

GEORGE M. FORMBY, OF JACKSONVILLE, FLORIDA, ASSIGNOR TO FORMBY PETRINITE CORPORATION, OF JACKSONVILLE, FLORIDA, A CORPORATION OF DELAWARE.

PLASTIC COMPOSITION AND METHOD OF PRODUCING THE SAME.

1,376,523.     Specification of Letters Patent.     Patented May 3, 1921.

No Drawing.     Application filed May 11, 1920. Serial No. 380,586.

*To all whom it may concern:*

Be it known that I, GEORGE M. FORMBY, a citizen of the United States, residing at Jacksonville, in the county of Duval and State of Florida, have invented certain new and useful Improvements in Plastic Compositions and Methods of Producing the Same; and I do hereby declare the following to be a full, clear, and exact description of the invention, such as will enable others skilled in the art to which it appertains to make and use the same.

This invention relates to cementitious composition and processes of making the same and has for its object to provide a composition of matter, and a method of producing it, which will be more efficient in action and less costly to employ than those heretofore proposed.

With these and other objects in view, the invention consists in the novel composition of matter, and in the novel steps and combinations of steps constituting the process, all as will be more fully hereinafter disclosed and particularly pointed out in the claims.

In carrying out this invention I may take, for example, proportions of:

| | |
|---|---|
| Calcium oxid, CaO, not less than | 70 lbs. |
| Magnesium oxid, MgO, not over | 2 lbs. |
| Calcium carbonate, $CaCO_3$, about | 2 lbs. |
| Calcium hydroxid, $Ca(OH)_2$, about | 20 lbs. |
| Magnesium hydroxid, $Mg(OH)_2$, about | 6 lbs. |

These compounds are thoroughly mixed in the dry state, and I then add sufficient water to form a creamy paste, and heat slowly until the water disappears. The mass is now allowed to cool, and is kept from contact with the air until ready for use, but preferably, it is reduced to a dry powder before storing it away. When it is to be used I finely divide said mass if it is not already in a powdered state, and I stir it slowly into hydrochloric acid, HCl, say of a strength of from 18°–36° Bé., and until all of said acid is used up. This point will be reached when the mass ceases to give off bubbles and changes from a yellowish to a dark ashy color. At the same time the previously evolved stifling fumes will have ceased.

With one hundred pounds of material as above set forth I would use about two hundred and fifty pounds of hydrochloric acid having a strength of 18° Bé. This mass at first may be said to have about the consistency of thick buttermilk, but after say twenty-four hours settling it separates into a mudlike substance at the bottom, and a supernatant fluid having about the consistency of a lubricating oil, and which will pour about as readily.

The foregoing procedure and composition of matter are or may be substantially the same as disclosed in my copending application No. 364,736 filed March 10, 1920 and entitled Cementitious compounds and processes of making the same.

According to this invention, on the other hand, I add to the oxychlorid composition including the supernatant fluid and the mudlike mass thus produced from 4 to 10 volumes of water and stir in from 5 to 11 volumes of commercial lime preferably high in calcium, or lime that has a high percentage of calcium oxid, CaO. The mixture thus had is now brought to a boil and allowed to set for 24 hours, when it is ready for various uses, among them that of mixing with the well known Keene's cement to form a plastic mass, which will soon harden into a stone like substance suitable for a large variety of purposes.

This said oxychlorid compound may be mixed with Keene's cement in all proportions, but I prefer to mix it in equal volumes, whereupon it greatly improves the stone like qualities of the cement, adds strength and hardness thereto, and causes the product to take on a higher polish after setting.

Very beautiful artificial stones are made by adding various coloring materials to a mixture of this oxychlorid and Keene's cement, and by polishing the same it is difficult to distinguish them from the natural stones. This material when in the plastic state is readily cut, and molded into any desired forms, shapes or articles, and if caused to set on a polished surface such as glass it presents a pleasing appearance without any polishing.

What I claim is:—

1. The process of producing a plastic composition which consists in adding water and lime to calcium oxychlorid; boiling the mixture thus produced and letting it set; and mixing Keene's cement with said mixture, substantially as described.

2. The process of producing a plastic composition which consists in adding water and lime to calcium and magnesium oxychlorid; boiling the mixture thus produced and letting it set; and mixing a substantially equal volume of Keene's cement with said mixture, substantially as described.

3. The herein described new article of manufacture the same containing a calcium oxychlorid that has been heated with lime in the presence of water and the compound thus produced mixed with Keene's cement, substantially as described.

4. The herein described new article of manufacture the same containing a calcium and magnesium oxychlorid that has been heated with lime in the presence of water and the compound thus produced mixed with an equal volume of Keene's cement, substantially as described.

In testimony whereof I affix my signature.

GEORGE M. FORMBY.